(12) United States Patent
Ficara et al.

(10) Patent No.: US 12,158,873 B2
(45) Date of Patent: Dec. 3, 2024

(54) READ-BASED STORAGE OF TIME-SERIES RECORDS

(71) Applicant: Cisco Technology, Inc., San Jose, CA (US)

(72) Inventors: Domenico Ficara, Essertines-sur-Yverdon (CH); Pedro Miguel Esteves Ramalhete, St Sulpice (CH); Yann Poupet, Le Mont sur Lausanne (CH); Thomas Vegas, Gland (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/894,369

(22) Filed: Aug. 24, 2022

(65) Prior Publication Data
US 2024/0070137 A1 Feb. 29, 2024

(51) Int. Cl.
G06F 16/00 (2019.01)
G06F 16/215 (2019.01)
G06F 16/22 (2019.01)

(52) U.S. Cl.
CPC ........ *G06F 16/2282* (2019.01); *G06F 16/215* (2019.01); *G06F 16/2228* (2019.01)

(58) Field of Classification Search
USPC ........................................................ 707/705
See application file for complete search history.

(56) References Cited

U.S. PATENT DOCUMENTS

| 2015/0127624 A1* | 5/2015 | Wintermute ...... G06F 16/24573 707/696 |
| 2018/0285398 A1* | 10/2018 | Nishiyama ......... G05B 19/0428 |
| 2020/0242096 A1 | 7/2020 | Zayats et al. |
| 2021/0089312 A1 | 3/2021 | Kothinti Naresh |
| 2022/0019600 A1 | 1/2022 | Dageville et al. |
| 2022/0083529 A1 | 3/2022 | Jain et al. |
| 2022/0188122 A1 | 6/2022 | Bos et al. |

OTHER PUBLICATIONS

"Understanding & Using Time Travel," Snowflake Documentation, https://docs.snowflake.com/en/user-guide/data-time-travel.html, retrieved from the Internet Jul. 18, 2022, 15 pages.
"If a tree falls in a forest," Wikipedia, https://en.wikipedia.org/wiki/If_a_tree_falls_in_a_forest, retrieved from the Internet Aug. 5, 2022, 5 pages.

* cited by examiner

*Primary Examiner* — Bai D Vu
(74) *Attorney, Agent, or Firm* — Edell, Shapiro & Finnan, LLC

(57) ABSTRACT

Techniques are provided for read-based storage of time-series records. In one example, a server obtains at least one indication of one or more records of a plurality of records written to a record database by a producer that have been read from the record database by at least one consumer. The server stores in a time-series database the one or more records that have been read by the at least one consumer. One or more records of the plurality of records that have not been read by the at least one consumer may be pruned from storage in the time-series database.

20 Claims, 11 Drawing Sheets

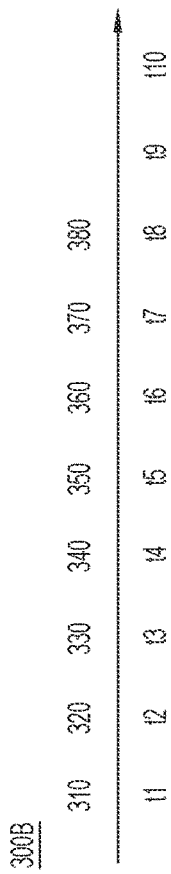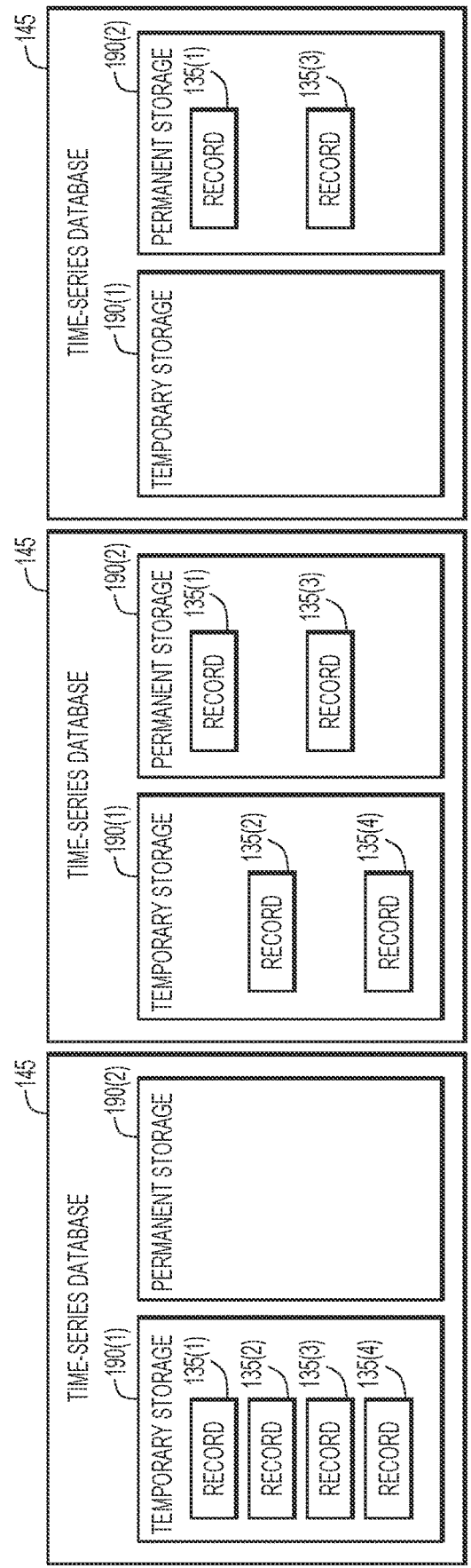
FIG.3B
FIG.3C

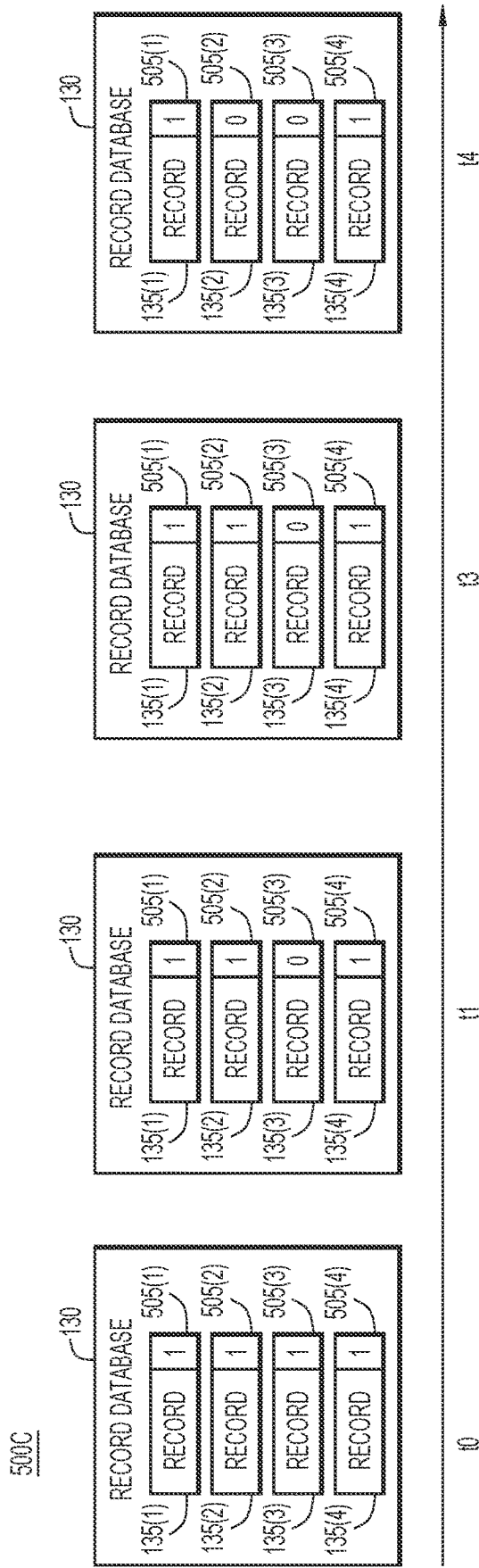

700

710
OBTAIN AT LEAST ONE INDICATION OF ONE OR MORE RECORDS OF A PLURALITY OF RECORDS WRITTEN TO A RECORD DATABASE BY A PRODUCER THAT HAVE BEEN READ FROM THE RECORD DATABASE BY AT LEAST ONE CONSUMER

720
STORE IN A TIME-SERIES DATABASE THE ONE OR MORE RECORDS THAT HAVE BEEN READ BY THE AT LEAST ONE CONSUMER

730
PRUNE FROM STORAGE IN THE TIME-SERIES DATABASE ONE OR MORE RECORDS OF THE PLURALITY OF RECORDS THAT HAVE NOT BEEN READ BY THE AT LEAST ONE CONSUMER

FIG.7

READ-BASED STORAGE OF TIME-SERIES RECORDS

TECHNICAL FIELD

The present disclosure relates to computer networking.

BACKGROUND

Producers are network entities that generate records of data. Consumers are network entities that read or access the records generated by producers. The records generated by producers can be tracked by time-series databases. When troubleshooting issues in a network that consists of numerous network entities (network devices and networking software), data needs to be maintained over time to allow for sufficient observability of network behavior.

BRIEF DESCRIPTION OF THE DRAWINGS

FIG. 3B illustrates a timeline of operations performed by the system of FIG. 3A, according to an example embodiment.

FIG. 3C illustrates a timeline of records stored in the time-series database of FIG. 3A, according to an example embodiment.

FIG. 5B illustrates a timeline of operations performed by the system of FIG. 5A, according to an example embodiment.

FIG. 5C illustrates a timeline of records and corresponding bits stored in the record database of FIG. 5A, according to an example embodiment.

FIG. 7 illustrates a flowchart of a method for performing functions associated with operations discussed herein, according to an example embodiment.

DESCRIPTION OF EXAMPLE EMBODIMENTS

Overview

Techniques are provided for read-based storage of time-series records associated with operation of network devices and networking software in a network. In one example embodiment, a server obtains at least one indication of one or more records of a plurality of records written to a record database by a producer that have been read from the record database by at least one consumer. The server stores in a time-series database the one or more records that have been read by the at least one consumer. One or more records of the plurality of records that have not been read by the at least one consumer may be pruned from storage in the time-series database.

Example Embodiments

Figure 1:
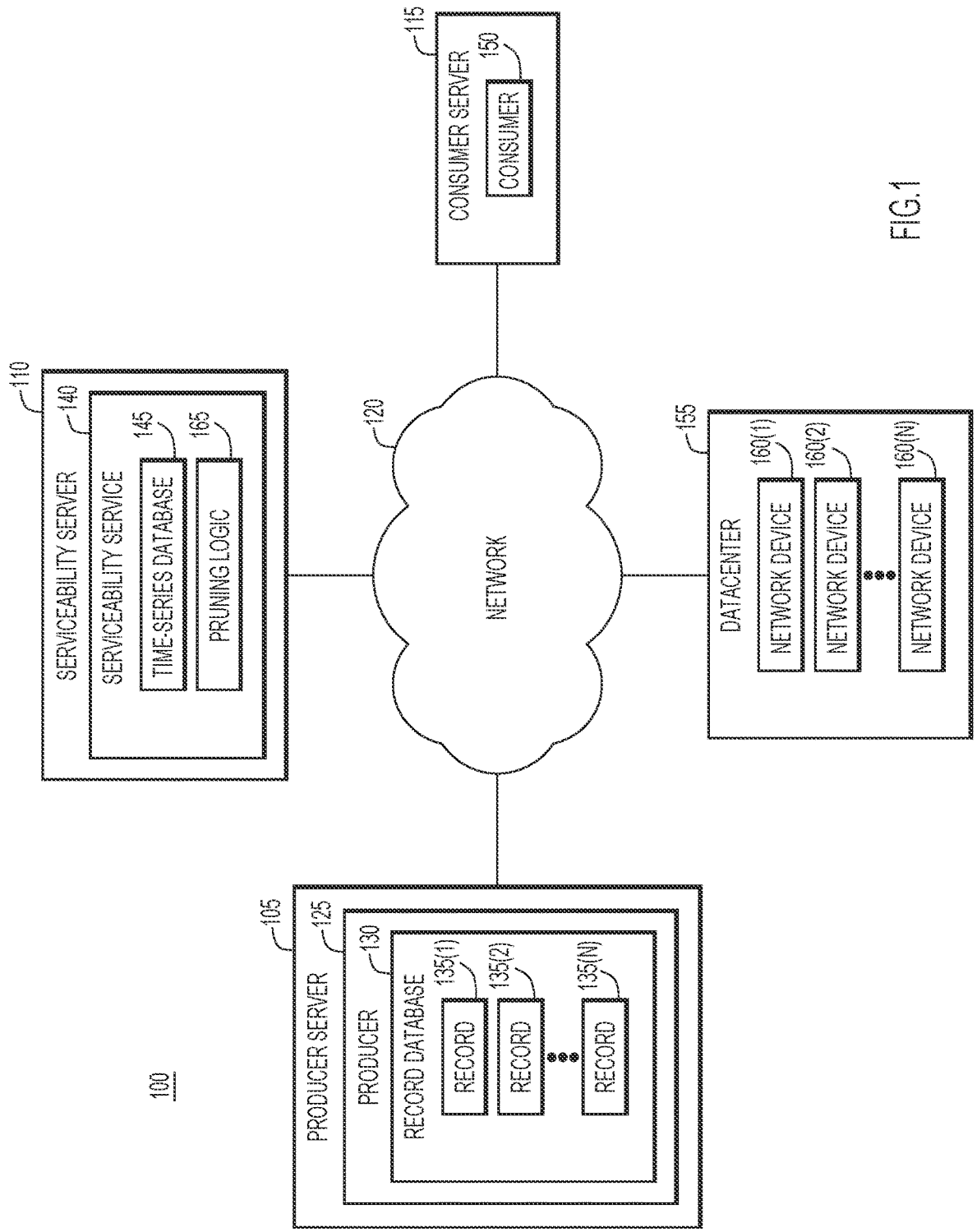
FIG. 1 illustrates a system configured to provide read-based storage of time-series records, according to an example embodiment.

FIG. 1 illustrates a system 100 configured to provide read-based storage of time-series records, according to an example embodiment. System 100 includes producer server 105, serviceability server 110, and consumer server 115. System 100 also includes network 120, which permits producer server 105, serviceability server 110, and consumer server 115 to communicate with each other.

Producer server 105 includes producer 125 (e.g., node, nanoservice, writer, etc.), which in turn includes record database 130 configured to locally store records 135(1)-135(N). In one example, producer 125 may write each of records 135(1)-135(N) to record database 130. Records 135(1)-135(N) may include data regarding network telemetry and/or networking events. Serviceability server 110 (e.g., a collector) includes serviceability service 140, which in turn includes time-series database 145 (e.g., time-travel database, replicate database, etc.). Time-series database 145 is configured to store one or more of records 135(1)-135(N) for troubleshooting purposes. Consumer server 115 includes consumer 150 (e.g., node, nanoservice, telemetry service, remote database, reader, etc.), which is configured to access/read/obtain one or more of records 135(1)-135(N) from time-series database 145.

In one example, records 135(1)-135(N) may respectively correspond to network devices (e.g., computers/servers) 160(1)-160(N) in a network (e.g., a network comprising datacenter 155). Records 135(1)-135(N) may include telemetry data relating to network devices 160(1)-160(N). The telemetry data may include computer names as lookup keys, Internet Protocol (IP) addresses, maximum numbers of outgoing connections, Central Processing Unit (CPU) temperatures, Graphics Processing Unit (GPU) temperatures, locations, etc.

In one specific example, consumer 150 may track the CPU/GPU temperatures and take corrective action in response to the temperature(s) exceeding a threshold. Examples of corrective actions may include temporarily shutting down datacenter 155 and subsequently powering-up datacenter 155 in an automated fashion. Time-series database 145 may maintain the evolution of one or more of records 135(1)-135(N) to enable troubleshooting the reason for the high temperature(s) that triggered the shut-down of datacenter 155. For example, time-series database 145 may be used to understand which record and record version caused the shut-down.

While each of producer 125, serviceability service 140, and consumer 150 is implemented on a respective server (i.e., producer server 105, serviceability server 110, and consumer server 115) in the specific example of system 100, it will be appreciated that producer 125, serviceability service 140, and consumer 150 may be implemented on any suitable number of servers. Furthermore, producer 125, serviceability service 140, and/or consumer 150 may comprise one or more virtual and/or physical network entities.

Conventionally, producer 125 would stream, to time-series database 145, a semantic description of each field of each of records 135(1)-135(N). Time-series database 145 would, in turn, save every one of records 135(1)-135(N). Thus, conventionally, time-series database 145 would capture all updates obtained from producer 125 to maintain a replica of records 135(1)-135(N) as record database 130 evolves. This may be referred to as "write-based tracking," because all records 135(1)-135(N) written by producer 125 to record database 130 are automatically stored in time-series database 145.

This conventional approach requires time-series database 145 to store a large amount of data, and hence impacts storage requirements for the underlying compute component (e.g., serviceability server 110) and/or limits the timespan for which time-series database 145 can retain one or more of records 135(1)-135(N). For example, if producer 125 writes records 135(1)-135(100) to record database 130, but only record 135(100) is read (e.g., at instant transmission by consumer 150), storing records 135(1)-135(99) in time-series database 145 offers minimal, if any, benefit for troubleshooting purposes.

Accordingly, to mitigate unnecessary storage for time-series database 145 and/or enable longer storage timespans of select ones of records 135(1)-135(N), pruning logic 165 is provided on serviceability service 140. Briefly, pruning logic 165 uses read-based tracking—rather than write-based tracking—to enable unnecessary ones of records 135(1)-135(N) to be pruned (e.g., purged) from time-series database 145. "Read-based tracking" may involve storing one or more of records 135(1)-135(N) in time-series database 145 based on which records 135(1)-135(N) have been read (e.g., by consumer 150).

As a result, time-series database 145 may store only those records that could have potentially impacted consumer 150 (and/or other any consumers configured to read one or more of records 135(1)-135(N)). Using read-based tracking, target records/updates may be identified for serviceability database replication and telemetry. This may reduce the total number of stored records while enabling reconstruction of operations involving a given networking device. While pruning logic 165 is provided on serviceability service 140 in the specific example of system 100, it will be appreciated that pruning logic 165, or any portion thereof, may also/alternatively be provided on producer 125 and/or consumer 150.

In one example, serviceability service 140 may obtain at least one indication of one or more of records 135(1)-135(N) that have been read from record database 130 by consumer 150. Serviceability service 140 may store, in time-series database 145, the one or more of records 135(1)-135(N) that have been read by consumer 150. Furthermore, one or more of records 135(1)-135(N) that have not been read by consumer 150 may be pruned from storage in time-series database 145. The pruning may be performed by one or more of producer 125, serviceability service 140, and/or consumer 150. As a result of the pruning, time-series database 145 may effectively serve as an historical database of observed events without placing undue burden on storage resources.

It will be appreciated that records 135(1)-135(N) may include updated versions of previously stored records. For instance, records 135(1)-135(N) may include versions of previously stored records that were updated in response to a change in IP address or temperature. In one specific example, if a record is read by consumer 150 and subsequently updated, then the updated version would not be considered to have been read by consumer 150, even though the original record was read by consumer 150. It will be further appreciated that records 135(1)-135(N) may include any suitable data relating to any suitable use case, and is not necessarily limited to use cases involving datacenter 155.

FIGS. 2A-2C, 3A-3C, and 4 illustrate embodiments in which serviceability server 110 obtains an indication of one or more read records from one or more consumers. FIGS. 5A-5D illustrate an embodiment in which serviceability server 110 obtains at least one indication of one or more read records from a producer. Each of FIGS. 2A-2C, 3A-3C, 4, and 5A-5D.

Figure 2A:
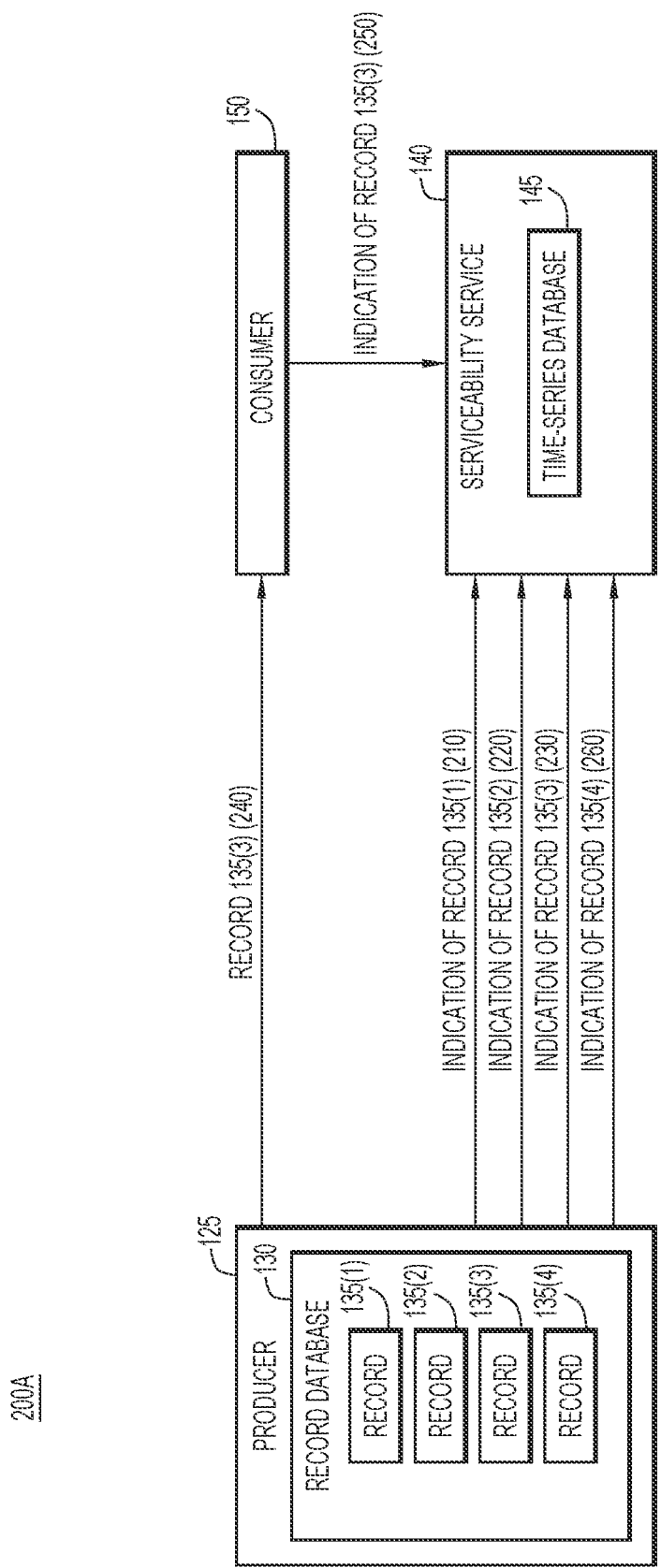
FIG. 2A illustrates a system configured to provide read-based storage of time-series records by deleting from a time-series database one or more records that have not been read by at least one consumer, according to an example embodiment.

With continuing reference to FIG. 1, FIG. 2A illustrates a system 200A configured to provide read-based storage of time-series records by deleting, from time-series database 145, one or more records (e.g., records 135(1) and 135(2)) that have not been read by consumer 150, according to an example embodiment. In this example, producer 125 generates sequential writes to record database 130 (i.e., records 135(1)-135(4)) and replicates each write to time-series database 145.

At operations 210-230, serviceability service 140 obtains, from producer 125, an indication of records 135(1)-135(3), which have been written to record database 130, and serviceability service 140 stores records 135(1)-135(3) in time-series database 145. The indications may signal that producer 125 wrote records 135(1)-135(3) to record database 130. At operation 240, consumer 150 reads record 135(3) from record database 130.

At operation 250, serviceability service 140 obtains, from consumer 150, an indication (e.g., a report) of record 135(3). The indication may signal that consumer 150 read record 135(3) from record database 130. In one example, consumer 150 may provide an indication to serviceability service 140 each time consumer 150 reads a respective record. In an alternative example, consumer 150 may cache the record and, once a threshold number of records have been cached or a time limit has been reached, provide multiple indications in bulk to serviceability service 140 (e.g., in a single aggregate report). This may prevent the report channel from becoming inundated with indications. It will be appreciated that readers and/or remote database systems may report the read. The indication(s) may include indexes that correspond to respective records (updates/entries).

In response to obtaining the indication of record 135(3) from consumer 150, serviceability service 140 may determine that records 135(1) and 135(2) were not read by consumer 150 (if they had been, consumer 150 would have provided an indication of records 135(1) and 135(2) before the indication of record 135(3), because records 135(1) and 135(2) were written to record database 130 before record 135(3)). Accordingly, serviceability service 140 deletes, from time-series database 145, records 135(1) and 135(2).

More generally, when serviceability service 140 obtains an indication of a record from consumer 150, serviceability service 140 may delete all earlier records except those for which an indication was obtained from consumer 150. At operation 260, serviceability service 140 obtains, from producer 125, an indication of record 135(4). The indication may signal that producer 125 wrote record 135(4) to record database 130. In response, serviceability service 140 stores record 135(4) in time-series database 145.

Figure 2B:
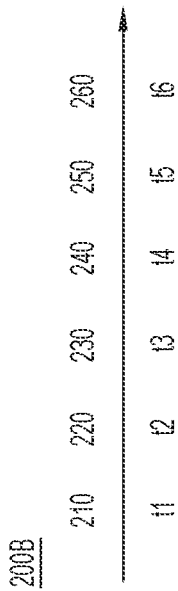
FIG. 2B illustrates a timeline of operations performed by the system of FIG. 2A, according to an example embodiment.
Figure 2C:
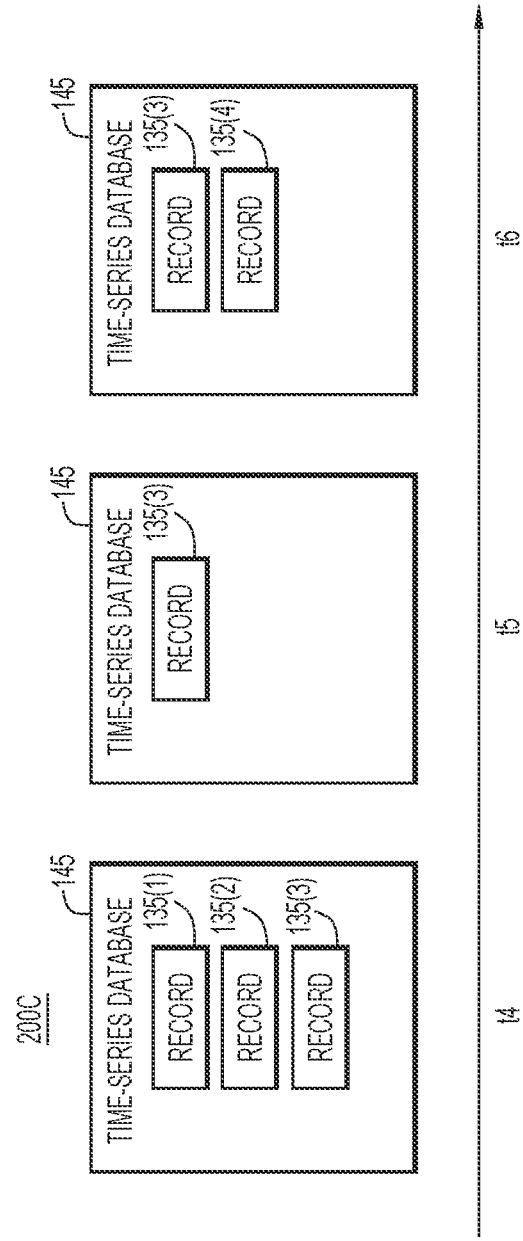
FIG. 2C illustrates a timeline of records stored in the time-series database of FIG. 2A, according to an example embodiment.

With continuing reference to FIGS. 1 and 2A, FIG. 2B illustrates a timeline 200B of operations performed by system 200A, according to an example embodiment. As shown in timeline 200B, operations 210-260 occur at times t1-t6, respectively. In particular, operation 240 (i.e., consumer 150 reading record 135(3) from record database 130) occurs at t4; operation 250 (i.e., serviceability service 140 obtaining the indication of record 135(3) from consumer 150) occurs at t5; and operation 260 (i.e., serviceability service 140 obtaining an indication of record 135(4) from producer 125) occurs at t6.

With continuing reference to FIGS. 1, 2A, and 2B, FIG. 2C illustrates a timeline 200C of records stored in time-series database 145, according to an example embodiment. As shown in timeline 200C, at t4 (i.e., when consumer 150 reads record 135(3) from record database 130), time-series database 145 includes records 135(1)-135(3). At t5 (i.e., when serviceability service 140 obtains the indication of record 135(3) from consumer 150), records 135(2) and 135(3) are deleted from time-series database 145. At t6 (i.e., when serviceability service 140 obtains the indication of record 135(4) from producer 125), record 135(4) is added to time-series database 145.

With continuing reference to FIGS. 1 and 2A-2C, FIG. 3A illustrates a system 300A configured to provide read-based storage of time-series records by temporarily storing records 135(1)-135(4) in time-series database 145, according to an example embodiment. System 300A is similar to system 200A, except that system 300A includes consumer 150(1) and consumer 150(2). Unlike in system 200A, serviceability service 140 simply deleting earlier records in response to receiving an indication that a record has been read in system 300A may lead to records being deleted before a consumer has reported that that record has been read. This can occur due to multipoint asynchronous reads, wherein the consumers read and report records out of order. To prevent these outcomes, records 135(1)-135(4) may be temporarily stored in time-series database 145 to enable asynchronous readers (consumers 150(1) and 150(2)) to inform time-series database 145 of new read operations, and time-series database 145 may permanently store only those records that were read.

At operations 310-330, serviceability service 140 obtains, from producer 125, one or more indications of records 135(1)-135(3), which have been written to record database 130. The indication(s) may signal that producer 125 wrote records 135(1)-135(3) to record database 130. In response to the indication(s), serviceability service 140 temporarily stores records 135(1)-135(3) in time-series database 145. The temporary storage may be any suitable buffering/staging area. Serviceability service 140 may temporarily store records 135(1)-135(3) utilizing a Least-Recently Used (LRU) lookup or an index-based lookup (e.g., between O(1) and O(log(n))), where each record 135(1)-135(3) has an index/identifier.

At operation 340, consumer 150(2) reads record 135(3) from record database 130. At operation 350, serviceability service 140 obtains, from consumer 150(2), an indication of record 135(3). The indication may reference record 135(3), e.g., may signal that consumer 150(2) read record 135(3) from record database 130. At operation 360, serviceability service 140 obtains, from producer 125, an indication of record 135(4). The indication may signal that producer 125 wrote record 135(4) to record database 130. In response, serviceability service 140 temporarily stores record 135(4) in time-series database 145. At operation 370, consumer 150(1) reads record 135(2) from record database 130. At operation 380, serviceability service 140 obtains, from consumer 150(1), an indication of record 135(2). The indication may signal that consumer 150(1) read record 135(2) from record database 130.

In response to obtaining the indication of record 135(3) from consumer 150(2) and the indication of record 135(2) from consumer 150(1), serviceability service 140 may permanently store record 135(3) and record 135(2) in time-series database 145. In some examples, time-series database 145 may move records 135(2) and 135(3) from temporary storage to permanent storage—and/or delete records 135(1) and 135(4) from temporary storage—when (1) one or more (e.g., all) consumers have provided their respective indications of reads, or (2) the temporary storage has reached a threshold amount of used memory and no additional consumers are expected to read (temporarily stored) records 135(1) or 135(4) from record database 130. Moving records 135(2) and 135(3) to permanent storage when the consumer(s) have provided their respective indications of reads may prevent frequently read data from lingering in temporary storage (for memory purposes). Deleting records 135(1) and 135(4) from temporary storage when it has reached a threshold amount of used memory and no additional consumers are expected to read records 135(1) or 135(4), may involve using a LRU cache to prevent lingering of records 135(1) and 135(4) in temporary memory, and thereby reduce memory requirements, since records 135(1) and 135(4) are not known to have been read. A safety time window may also/alternatively be maintained to permit some never-read read ports (corresponding to one or more records) to be flushed in the permanent memory of time-series database 145.

Thus, unlike in system 200A, when serviceability service 140 obtains an indication of a record from consumer 150(1) or consumer 150(2), serviceability service 140 may move the record from temporary storage to permanent storage in time-series database 145. If serviceability service 140 followed the method described above in connection with system 200A, it would delete records 135(1) and 135(2) before receiving the indication that consumer 150(1) read record 135(2), and may not have been able to recover record 135(2). Thus, the method described in connection with system 300A may be implemented to address the potentially asynchronous nature of multiple distributed consumers. In particular, this method may permit time-series database 145 to retain a record, instead of deleting it, even if the record entry was outdated when read and/or reported late.

Figure 3A:
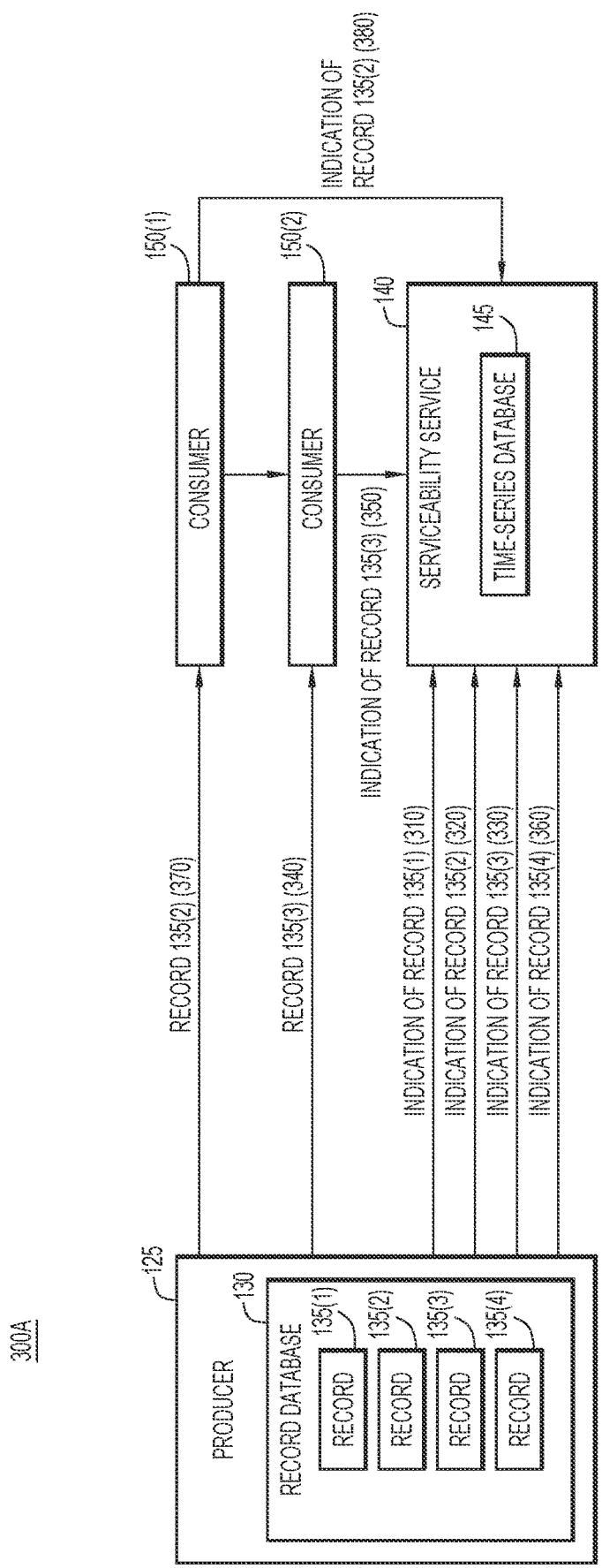
FIG. 3A illustrates a system configured to provide read-based storage of time-series records by temporarily storing a plurality of records in a time-series database, according to an example embodiment.

With continuing reference to FIGS. 1 and 3A, FIG. 3B illustrates a timeline 300B of operations performed by system 300A, according to an example embodiment. As shown in timeline 300B, operations 310-380 occur at times t1-t8, respectively. In particular, operation 350 (i.e., serviceability service 140 obtaining an indication of record 135(3)) occurs at t5, and operation 380 (i.e., serviceability service 140 obtaining an indication of record 135(2)) occurs at t8.

With continuing reference to FIGS. 1, 3A, and 3B, FIG. 3C illustrates a timeline 300C of records stored in time-series database 145, according to an example embodiment. As shown in timeline 300C, at t8 (i.e., when serviceability service 140 obtains an indication of record 135(2)), time-series database 145 includes records 135(1)-135(4) in temporary storage 390(1) and no records in permanent storage 190(2). At t9, time-series database moves records 135(1) and 135(3) from temporary storage 190(1) to permanent storage 190(2). At t10, records 135(2) and 135(4) are deleted from temporary storage 190(1). Thus, time-series database 145 may present a final view of the reads that have been reported by consumers 150(1) and 150(2).

Figure 4:
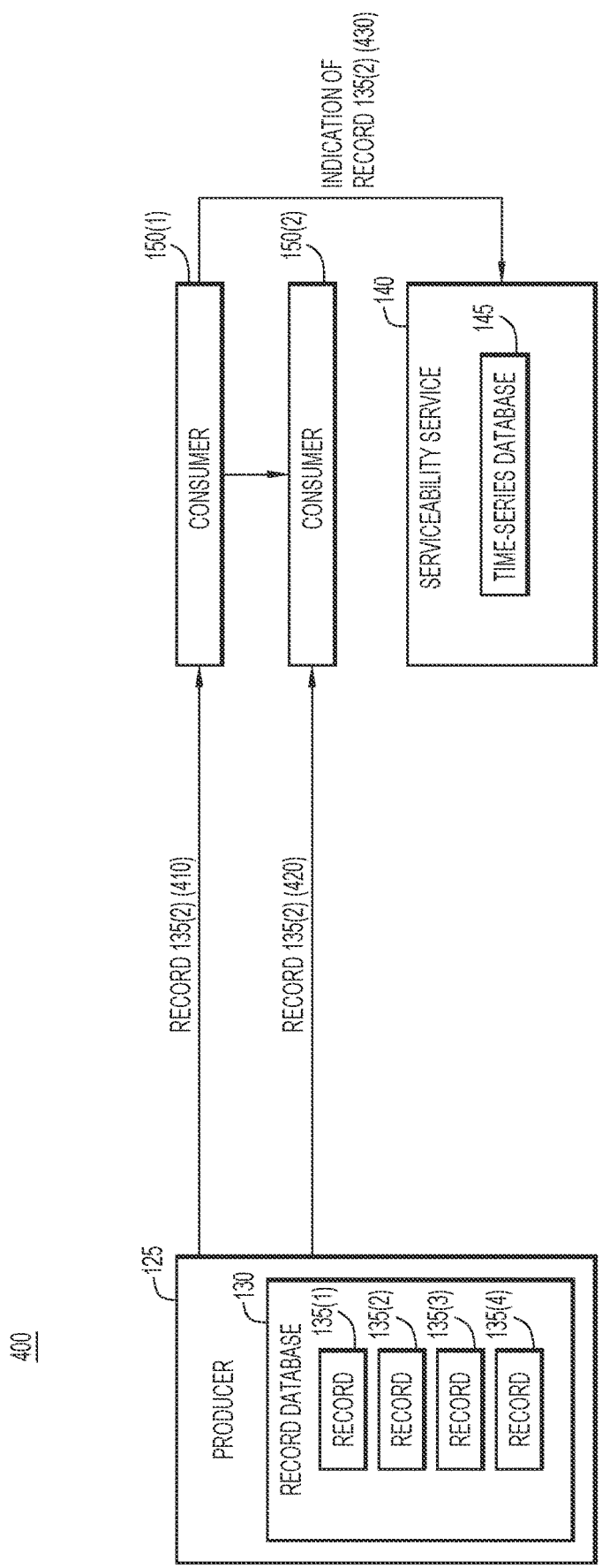
FIG. 4 illustrates a system configured to provide read-based storage of time-series records by obtaining from a first consumer an indication of one or more records that have been read by at least one consumer that has not been and will not be obtained from one or more second consumers, according to an example embodiment.

With continuing reference to FIG. 1, FIG. 4 illustrates a system 400 configured to provide read-based storage of time-series records by obtaining, from consumer 150(1), an indication of record 135(2), according to an example embodiment. In this example, record 135(2) has been read by both consumers 150(1) and 150(2), but an indication of record 135(2) is obtained by serviceability service 140 from consumer 150(1) and not from consumer 150(2). In other words, an indication has not been and will not be obtained from consumer 150(2). This may be referred to as a "reader-writeback mechanism" because the replication to time-series database 145 is performed by consumer 150(1) and not by producer 125. The reader-write-back mechanism may involve read-based write replication, thereby enabling full observability using decentralized replication.

If every consumer (consumer 150(1) and 150(2)) performed replication by sending, to serviceability service 140, an indication of every record that the respective consumer reads from record database 130, that would result in serviceability service 140 receiving data that was already reported as having been read. Because serviceability service 140 may decide to store a record based on that record having been read by any consumer, it may be unnecessary to send subsequent updates regarding the same record. To avoid sending superfluous updates to serviceability service 140, provided is a fully decentralized mechanism that relieves producer 125 from sending updates while avoiding duplicate replications of reader (e.g., consumer) originated database updates.

At operations 410 and 420, consumers 150(1) and 150(2) read record 135(2). At least three alternative techniques are provided to prevent both consumers 150(1) and 150(2) from sending an indication of record 135(2) to serviceability service 140. A first technique involves consumers 150(1) and 150(2) updating record database 130 to inform any future readers that: (1) read replication has been performed for record 135(2) and there is no need for the future reader to replicate record 135(2) to time-series database 145, or (2) read replication will be performed for record 135(2), in case the future reader decides to replicate record 135(2). A second technique involves consumers 150(1) and 150(2) querying serviceability service 140 for the latest version/identifier/sequence of data that was replicated, and providing an indication of the read data if the version of the read data is more recent. A third technique involves consumers 150(1) and 150(2) informing serviceability service 140 that a specific version of data was read, and serviceability service 140 may, in turn, pull/query content for that specific version if not already stored in time-series database 145. Based on any one or more of these three techniques, at operation 430, consumer 150(1) (but not consumer 150(2)) provides an indication of record 135(2) to serviceability service 140.

Figure 5A:
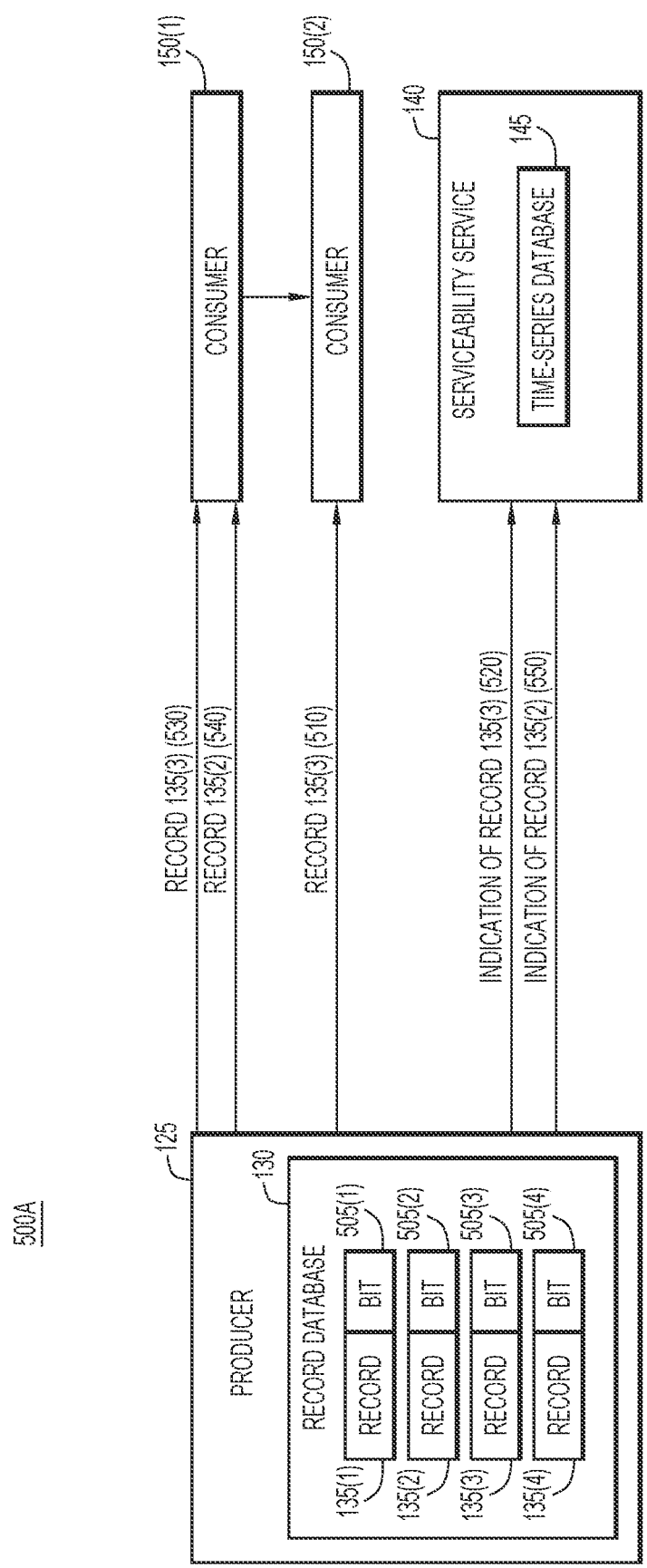
FIG. 5A illustrates a system configured to provide read-based storage of time-series records by obtaining at least one indication of one or more records that have been read by at least one consumer from a producer, according to an example embodiment.

With continuing reference to FIG. 1, FIG. 5A illustrates a system 500A configured to provide read-based storage of time-series records by obtaining, from producer 125, at least one indication of records 135(2) and 135(3), according to an example embodiment. In this example, records 135(2) and 135(3) have been read by consumer 150(1) and/or consumer 150(2). To avoid replicating data that was never read, producer 125 may determine whether at least one prior indication of records 135(2) and 135(3) has been obtained by serviceability service 140. If at least one prior indication of records 135(2) and 135(3) has been obtained by service-ability service 140, producer 125 may provide the at least one indication of records 135(2) and 135(3) to serviceability service 140.

Producer 125 may exploit knowledge regarding reads of records 135(1)-135(4) from record database 130 using inline processing. The content of the corresponding record at read time may be relevant. In one example, record database 130 maintains bits 505(1)-505(4) for each record 135(1)-135(4). Whenever a record is updated, the corresponding bit is set to a first value (e.g., 1), if it is not already set to the first value. When a record is read, the corresponding bit is set to a second value (e.g., 0), if it is not already set to the second value. If the corresponding bit was the first value (e.g., 1) when the record was read, producer 125 provides an update regarding the record to serviceability service 140. However, producer 125 may wait to send the update to serviceability service 140, to aggregate multiple updates and thereby save processing power and transport bandwidth. If the corresponding bit was the second value (e.g., 0), the reads may not trigger producer 125 to provide an update regarding the record to serviceability service 140. Thus, using bits 505(1)-505(4), time-series database 145 may provide an update when the corresponding record is read, while avoiding sending duplicate information to serviceability service 140.

Initially, bits 505(1)-505(4) are set to the first value (e.g., 1). At operation 510, consumer 150(2) reads record 135(3) from record database 130, and producer 125 flips bit 505(3) to the second value (e.g., 0). Because bit 505(3) was set to 1, producer 125 provides an indication of record 135(3) to serviceability service 140. At operation 520, serviceability service 140 obtains, from producer 125, the indication of record 135(3). At operation 530, consumer 150(1) reads record 135(3) from record database 130. Because bit 505(3) is set to 0, producer 125 does not provide another indication of record 135(3) to serviceability service 140. At operation 540, consumer 150(1) reads record 135(2) from record database 130, and producer 125 flips bit 505(2) to 0. Because bit 505(2) was set to 1, producer 125 provides an indication of record 135(3) to serviceability service 140. At operation 550, serviceability service 140 obtains, from producer 125, the indication of record 135(2). Thus, in this example, the indications of records 135(2) and 135(3) are provided from producer 125 to serviceability service 140 once.

With continuing reference to FIGS. 1 and 5A, FIG. 5B illustrates a timeline 500B of operations performed by system 500A, according to an example embodiment. As shown in timeline 500B, operations 510-550 occur at times t1-5, respectively. In particular, operation 510 (i.e., consumer 150(2) reading record 135(3) from record database 130) occurs at t1; operation 530 (i.e., consumer 150(1) reading record 135(3) from record database 130) occurs at t3; and operation 540 (i.e., consumer 150(1) reads record 135(2) from record database 130) occurs at t4.

With continuing reference to FIGS. 1, 5A, and 5B, FIG. 5C illustrates a timeline 500C of records 135(1)-135(4) and bits 505(1)-505(4) stored in record database 130, according to an example embodiment. As shown in timeline 500C, at to, bits 505(1)-505(4) are set to 1. At t1 (i.e., when consumer 150(2) reads record 135(3) from record database 130), bit 505(3) is flipped to O. At t3 (i.e., when consumer 150(1) reads record 135(3) from record database 130), bit 505(3) remains set to 0. At t4 (i.e., when consumer 150(1) reads record 135(2) from record database 130), bit 505(2) is flipped to 0.

Figure 5D:
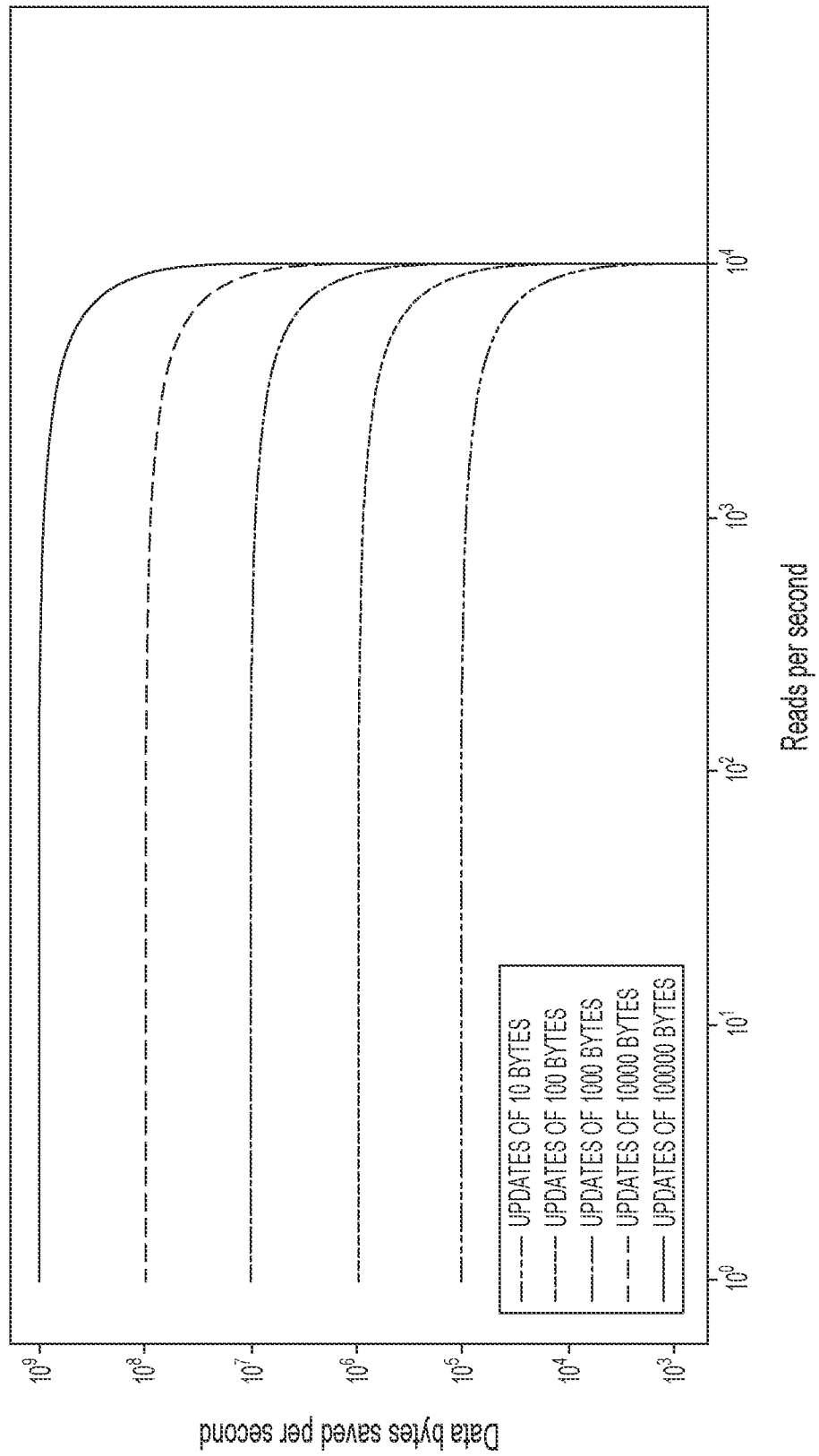
FIG. 5D illustrates a plot showing how many bytes can be saved using the system of FIG. 5A.

FIG. 5D illustrates a plot 500D showing how many bytes can be saved using system 500A. As shown, large amounts of data are saved when reads/second is lower than writes/ second. Thus, most data is saved starting from a read/write ratio of ½ or lower, with less frequent reads.

Figure 6:
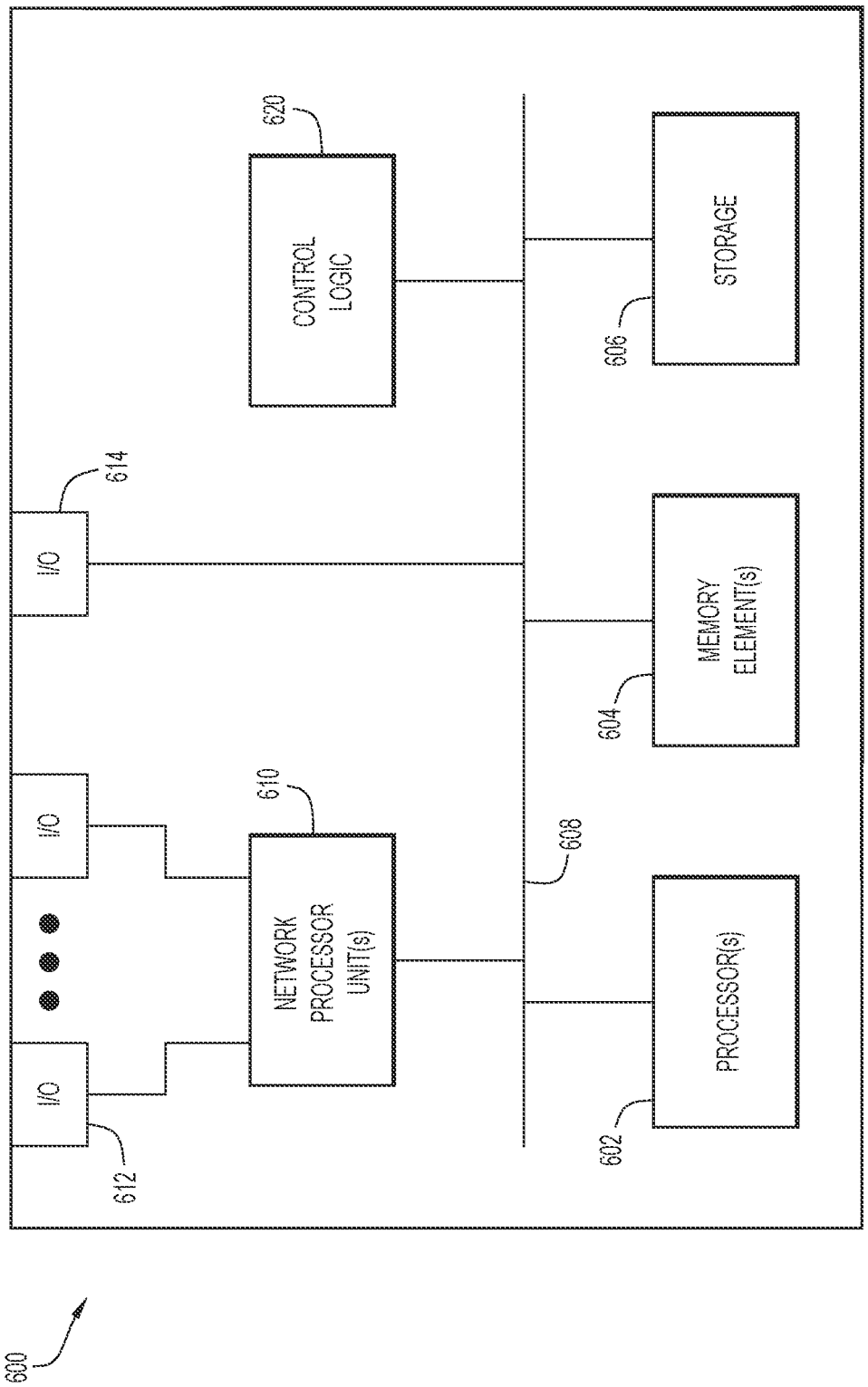
FIG. 6 illustrates a hardware block diagram of a computing device configured to perform functions associated with operations discussed herein, according to an example embodiment.

Referring to FIG. 6, FIG. 6 illustrates a hardware block diagram of a computing device 600 (e.g., producer server 105, serviceability server 110, and/or consumer server 115) that may perform functions associated with operations discussed herein in connection with the techniques depicted in FIGS. 1, 2A-2C, 3A-3C, 4, and 5A-5D. In various embodiments, a computing device, such as computing device 600 or any combination of computing devices 600, may be configured as any entity/entities as discussed for the techniques depicted in connection with FIGS. 1, 2A-2C, 3A-3C, 4, and 5A-5D in order to perform operations of the various techniques discussed herein.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 600 for transfer onto another computer readable storage medium.

FIG. 7 is a flowchart of an example method 700 for performing functions associated with operations discussed herein. Any operation of method 700 may be performed by any suitable entity, such as producer server 105, serviceability server 110, and/or consumer server 115 (FIG. 1). In the following example, serviceability server 110 performs operations 710 and 720. At operation 710, serviceability server 110 obtains at least one indication of one or more records of a plurality of records written to a record database by a producer that have been read from the record database by at least one consumer. At operation 720, serviceability server 110 stores in a time-series database the one or more records that have been read by the at least one consumer. At operation 730, one or more records of the plurality of records that have not been read by the at least one consumer are pruned from storage in the time-series database.

Several alternative techniques are presented which may be implemented in accordance with method 700. Single-reader (FIGS. 2A-2C), multi-reader (FIGS. 3A-3C, 4, 5A-5D), and write-back techniques (FIGS. 4, 5A-5D) may be used for collecting a minimum number of records at a time-series database to reconstruct the evolution of data for serviceability and assurance purposes. These techniques may focus on providing effective data updates (e.g., those records that can potentially influence the system), rather than blanket data updates in a multi-device asynchronous system.

As described herein, read-based tracking replication enables ideal replication/retention adaptation without specific heuristics. In one example, read-based tracking is provided with eventual database trimming (e.g., multiple readers provide asynchronous notifications) (FIGS. 3A-3C). In another example, read-based tracking is provided wherein the reader itself, and not the producer, performs replication to the time-series database (FIG. 4). In still another example, read-based tracking is provided with pre-replication trimming (e.g., records that area never read, are never sent to the time-series database) (FIGS. 5A-5D).

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a computer-implemented method is provided. The method comprises: obtaining at least one indication of one or more records of a plurality of records written to a record database by a producer that have been read from the record database by at least one consumer; storing in a time-series database the one or more records that have been read by the at least one consumer; and pruning from storage in the time-series database one or more records of the plurality of records that have not been read by the at least one consumer.

In one example, the method further comprises: obtaining the at least one indication of the one or more records that have been read by the at least one consumer from the at least one consumer. In a further example, the method further comprises: obtaining, from the producer, at least one indication of the plurality of records written to the record database; and storing the plurality of records in the time-series database, wherein: pruning from storage in the time-series database the one or more records that have not been read by the at least one consumer includes deleting from the time-series database the one or more records that have not been read by the at least one consumer. In a still further example, storing the plurality of records in the time-series database includes: temporarily storing the plurality of records in the time-series database; and in response to obtaining the at least one indication of the one or more records that have been read by the at least one consumer from the at least one consumer, permanently storing in the time-series database the one or more records that have been read by the at least one consumer. In another further example, the method further comprises: obtaining the at least one indication of the one or more records that have been read by the at least one consumer from a first consumer of the at least one consumer responsive to a determination that the at least one indication of the one or more records that have been read by the at least one consumer has not been and will not be obtained from one or more second consumers of the at least one consumer.

In one example, the method further comprises: obtaining the at least one indication of the one or more records that have been read by the at least one consumer from the producer. In a further example, the method further comprises: obtaining the at least one indication of the one or more records that have been read by the at least one consumer responsive to the producer determining that at least one prior indication of the one or more records that have been read by the at least one consumer has not been obtained.

In one example, the plurality of records includes telemetry data relating to one or more network devices in a network.

In another form, an apparatus is provided. The apparatus comprises: a network interface configured to obtain or provide network communications; and one or more processors coupled to the network interface, wherein the one or more processors are configured to: obtain at least one indication of one or more records of a plurality of records written to a record database by a producer that have been read from the record database by at least one consumer; store in a time-series database the one or more records that have been read by the at least one consumer; and prune from storage in the time-series database one or more records of the plurality of records that have not been read by the at least one consumer.

In another form, one or more non-transitory computer readable storage media are provided. The non-transitory computer readable storage media are encoded with instructions that, when executed by a processor, cause the processor to: obtain at least one indication of one or more records of a plurality of records written to a record database by a producer that have been read from the record database by at least one consumer; store in a time-series database the one or more records that have been read by the at least one consumer; and prune from storage in the time-series database one or more records of the plurality of records that have not been read by the at least one consumer.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   storing, in a time-series database, a plurality of records received from a record database of a producer, the record database including one or more records of the plurality of records that have been read by at least one consumer;
   obtaining at least one indication of the one or more records of the plurality of records that have been read from the record database by the at least one consumer; and
   reducing a storage impact of storing the plurality of records in the time-series database by pruning from storage in the time-series database one or more records of the plurality of records that have not been read by the at least one consumer,
   wherein the one or more records of the plurality of records that have not been read by the at least one consumer were previously stored in the time-series database.

2. The method of claim 1, further comprising:
   obtaining the at least one indication of the one or more records that have been read by the at least one consumer from the at least one consumer.

3. The method of claim 2, further comprising:
   obtaining, from the producer, at least one indication of the plurality of records written to the record database; and
   storing the plurality of records in the time-series database, wherein:
   pruning from storage in the time-series database the one or more records that have not been read by the at least one consumer includes deleting from the time-series database the one or more records that have not been read by the at least one consumer.

4. The method of claim 3, wherein storing the plurality of records in the time-series database includes:
   temporarily storing the plurality of records in the time-series database; and
   in response to obtaining the at least one indication of the one or more records that have been read by the at least one consumer from the at least one consumer, permanently storing in the time-series database the one or more records that have been read by the at least one consumer.

5. The method of claim 2, further comprising:
   obtaining the at least one indication of the one or more records that have been read by the at least one consumer from a first consumer, but not from a second consumer.

6. The method of claim 1, further comprising:
   obtaining the at least one indication of the one or more records that have been read by the at least one consumer from the producer.

7. The method of claim 6, further comprising:
   obtaining the at least one indication of the one or more records that have been read by the at least one consumer responsive to a producer server, on which the producer is hosted, determining that at least one prior indication of the one or more records that have been read by the at least one consumer has not been obtained.

8. The method of claim 1, wherein the plurality of records includes telemetry data relating to one or more network devices in a network.

9. An apparatus comprising:
   a network interface configured to obtain or provide network communications; and
   one or more processors coupled to the network interface, wherein the one or more processors are configured to:
   store, in a time-series database, a plurality of records received from a record database of a producer, the record database including one or more records of the plurality of records that have been read by at least one consumer;
   obtain at least one indication of the one or more records of plurality of records that have been read from the record database by the at least one consumer; and
   reduce a storage impact of storing the plurality of records in the time-series database by pruning from storage in the time-series database one or more records of the plurality of records that have not been read by the at least one consumer,
   wherein the one or more records of the plurality of records that have not been read by the at least one consumer were previously stored in the time-series database.

10. The apparatus of claim 9, wherein the one or more processors are further configured to:
    obtain the at least one indication of the one or more records that have been read by the at least one consumer from the at least one consumer.

11. The apparatus of claim 10, wherein the one or more processors are further configured to:
    obtain, from the producer, at least one indication of the plurality of records written to the record database;

temporarily store the plurality of records in the time-series database;

in response to obtaining the at least one indication of the one or more records that have been read by the at least one consumer from the at least one consumer, permanently store in the time-series database the one or more records that have been read by the at least one consumer; and delete from the time-series database the one or more records that have not been read by the at least one consumer.

12. The apparatus of claim 10, wherein the one or more processors are further configured to:

obtain the at least one indication of the one or more records that have been read by the at least one consumer from a first consumer of the at least one consumer, but not from a second consumer.

13. The apparatus of claim 9, wherein the one or more processors are further configured to:

obtain the at least one indication of the one or more records that have been read by the at least one consumer from the producer.

14. The apparatus of claim 13, wherein the one or more processors are further configured to:

obtain the at least one indication of the one or more records that have been read by the at least one consumer responsive to a producer server, on which the producer is hosted, determining that at least one prior indication of the one or more records that have been read by the at least one consumer has not been obtained.

15. One or more non-transitory computer readable storage media encoded with instructions that, when executed by a processor, cause the processor to:

store, in a time-series database, a plurality of records received from a record database of a producer, the record database including one or more records of the plurality of records that have been read by at least one consumer;

obtain at least one indication of the one or more records of the plurality of records that have been read from the record database by the at least one consumer; and reducing a storage impact of storing the plurality of records in the time-series database by pruning from storage in the time-series database one or more records of the plurality of records that have not been read by the at least one consumer, wherein the one or more records of the plurality of records that have not been read by the at least one consumer were previously stored in the time-series database.

16. The one or more non-transitory computer readable storage media of claim 15, wherein the instructions further cause the processor to:

obtain the at least one indication of the one or more records that have been read by the at least one consumer from the at least one consumer.

17. The one or more non-transitory computer readable storage media of claim 16, wherein the instructions further cause the processor to:

obtain, from the producer, at least one indication of the plurality of records written to the record database;

temporarily store the plurality of records in the time-series database;

in response to obtaining the at least one indication of the one or more records that have been read by the at least one consumer from the at least one consumer, permanently store in the time-series database the one or more records that have been read by the at least one consumer; and delete from the time-series database the one or more records that have not been read by the at least one consumer.

18. The one or more non-transitory computer readable storage media of claim 16, wherein the instructions further cause the processor to:

obtain the at least one indication of the one or more records that have been read by the at least one consumer from a first consumer, but not from a second consumer.

19. The one or more non-transitory computer readable storage media of claim 15, wherein the instructions further cause the processor to:

obtain the at least one indication of the one or more records that have been read by the at least one consumer from the producer.

20. The one or more non-transitory computer readable storage media of claim 19, wherein the instructions further cause the processor to:

obtain the at least one indication of the one or more records that have been read by the at least one consumer responsive to a producer server, on which the producer is hosted, determining that at least one prior indication of the one or more records that have been read by the at least one consumer has not been obtained.

* * * * *